Nov. 7, 1939.  M. P. WHITNEY  2,178,712
VARIABLE-SPEED TRANSMISSION
Filed July 27, 1937  3 Sheets-Sheet 1

Witness:
Burr W. Jones

INVENTOR.
BY Maurice P. Whitney
Clinton S. James
ATTORNEY.

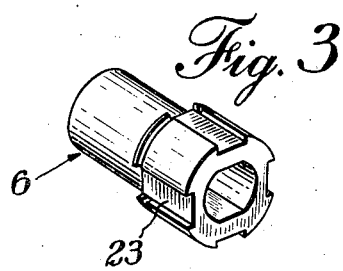
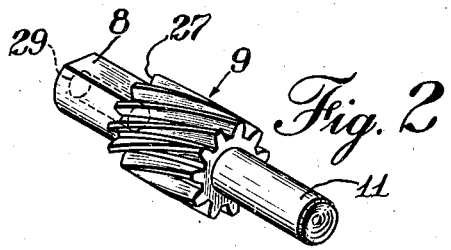
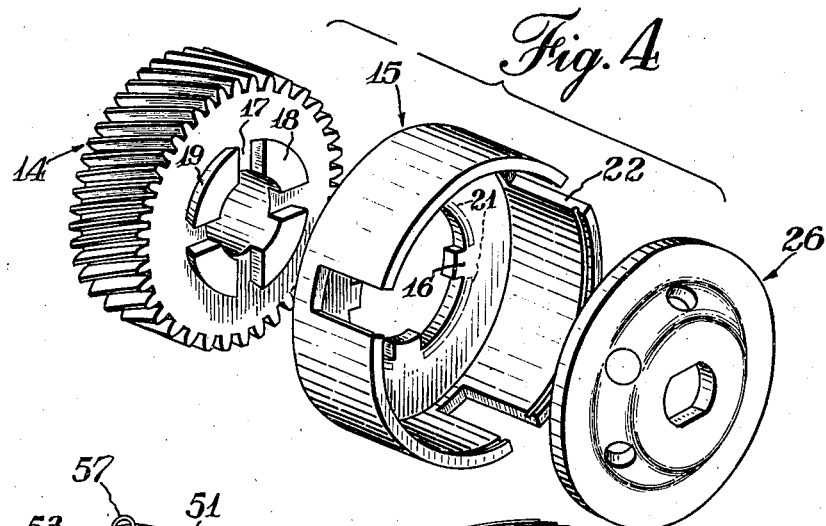
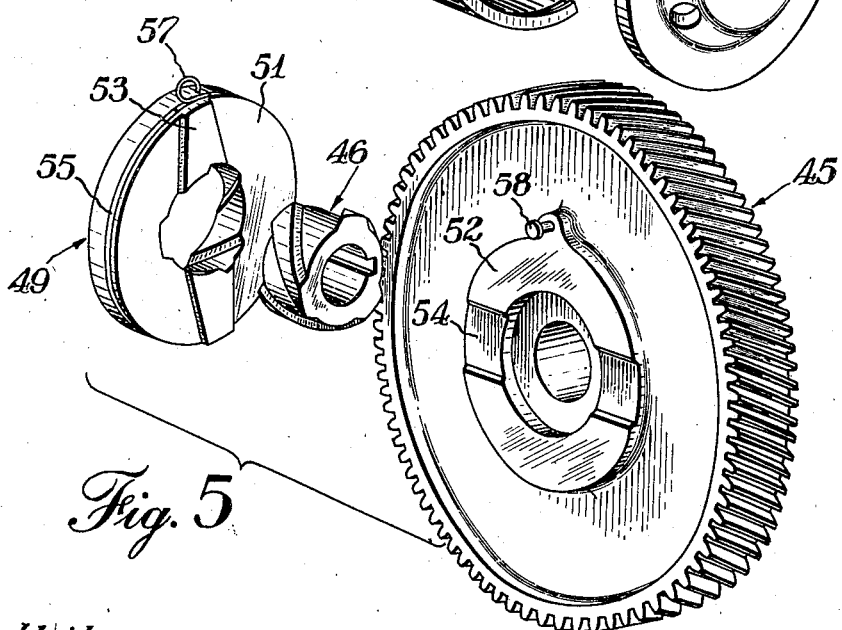

Patented Nov. 7, 1939

2,178,712

UNITED STATES PATENT OFFICE 2,178,712

VARIABLE-SPEED TRANSMISSION

Maurice P. Whitney, Elmira, N. Y., assignor, by mesne assignments, to Bendix Aviation Corporation, South Bend, Ind., a corporation of Delaware Application July 27, 1937, Serial No. 155,931

9 Claims. (Cl. 74—368)

The present invention relates to a variable-speed transmission and more particularly to a two-speed reduction gearing particularly adapted for operating light machinery such as domestic washing machines or other appliances which are driven from a single source of power at low and at high speeds during different phases of the operation thereof.

It is an object of the present invention to provide a novel variable speed gear transmission which is efficient and reliable in operation while being simple and economical in construction.

It is another object to provide such a device which is especially well-adapted for automatic operation and control.

It is a further object to provide such a device in which the gear elements are constantly in mesh, the speed changes being effected by the manipulation of a friction clutch.

It is a further object to provide such a device in which the low speed gearing is operative at all times except when the high speed gearing is rendered effective, at which time the low speed gearing is arranged to overrun.

It is another object to provide such a device in which the high speed gearing is controlled through a friction clutch which may be operated manually or electromagnetically.

It is another object to provide such a device having special provisions for ensuring the release of said clutch when it is desired to operate in low gear.

Further objects and advantages will be apparent from the following description taken in connection with the accompanying drawings in which:

Fig. 2 is a detail in perspective of the low speed drive pinion member;

Fig. 3 is a similar view of the high speed clutch sleeve;

Fig. 4 is a similar view of the high speed drive gear, high speed clutch barrel and clutch control plate in disassembled position;

Fig. 5 is a similar view of the low speed driven gear with its clutch elements in disassembled relation.

Figure 1:
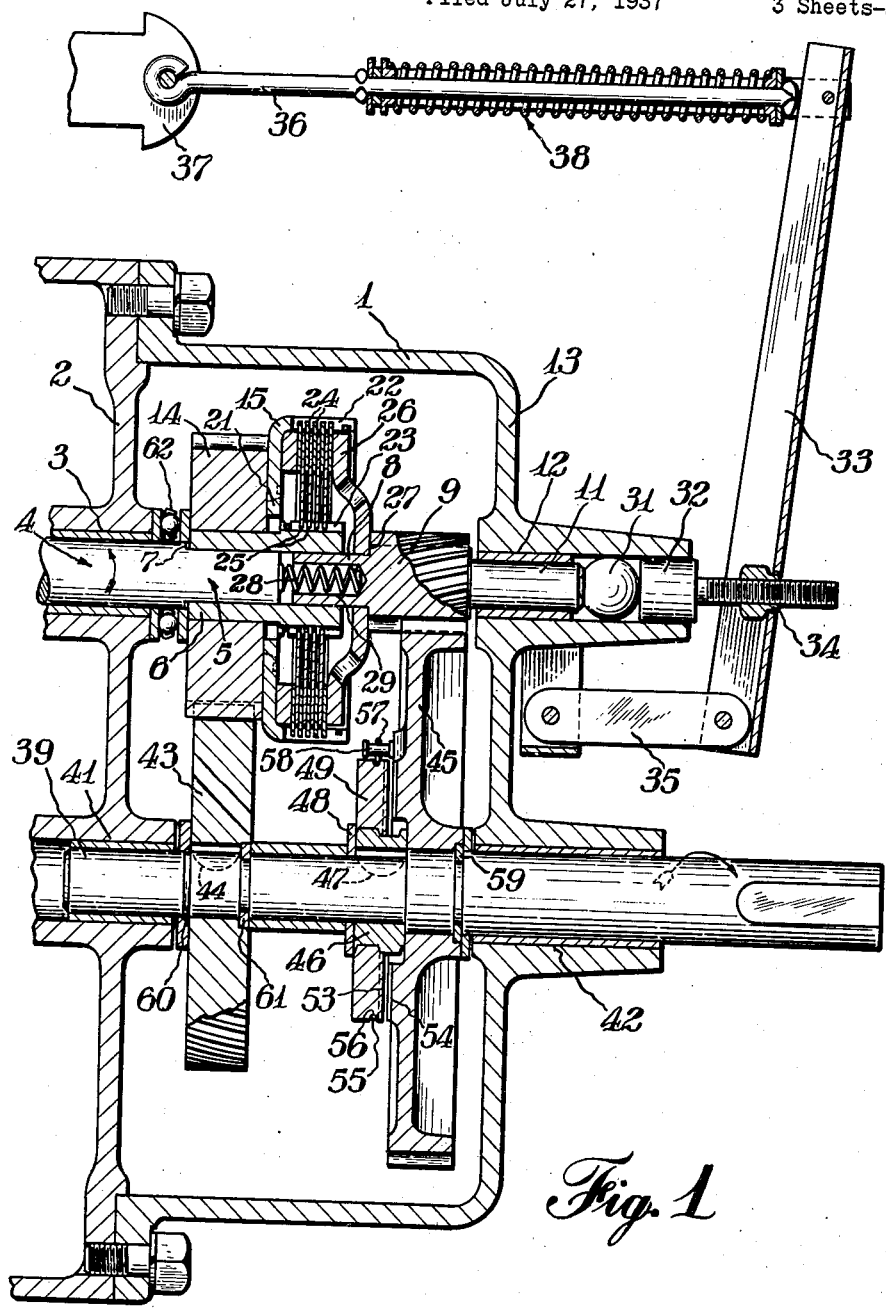
Fig. 1 is substantially a vertical mid-sectional view of a preferred embodiment of the invention.

Referring first to Fig. 1 of the drawings, there is illustrated a casing 1 in one wall 2 of which is journalled at 3 a drive shaft 4 which may be the extended armature shaft of an electric motor, not illustrated. The extended portion 5 of the drive shaft 4 within the casing 1 is provided with a non-circular cross section such as a "double-D" section, and a clutch sleeve 6 having a bore conforming thereto is slidably mounted thereon, normally spaced from a shoulder 7 formed at the termination of the "double-D" portion 5 of the shaft. Clutch sleeve 6 extends beyond the end of shaft 4 to form a socket for a projection 8 of "double-D" section slidably fitting therein formed on a low speed pinion member 9. Sleeve 6 and projection 8 thus form an extensible coupling between pinion 9 and shaft 4. The pinion member 9 is provided with a cylindrical extension in the form of a stub shaft 11 slidably journalled as indicated at 12 in the opposite wall 13 of the casing 1.

A high speed driving gear 14 is journalled on the exterior of the clutch sleeve 6 and is provided with a barrel member 15 rigidly anchored thereto as by means of interlocking lugs and recesses 16, 17 (Fig. 4). Preferably the gear 14 is provided with projections 18 defining the recesses 17 which are peripherally undercut as indicated at 19, and the inner periphery of the barrel 15 intermediate the lugs 16 is pressed into interlocking engagement with said projections as indicated at 21.

The barrel member 15 is provided with longitudinal slots 22 in its periphery, and the clutch sleeve 6 is provided with peripheral grooves 23 (Fig. 3), and clutch discs 24 and 25 are slidably mounted in the barrel and provided with lugs extending alternately into the slots 22 of the barrel and the grooves 23 of the clutch sleeve. A clutch control plate 26 is non-rotatably mounted on the projecting portion 8 of the low speed driving pinion 9, bearing against a shoulder 27 at the base of said extension and projecting within the end of the barrel 15 into proximity with the clutch discs therein. Suitable means such as a spring 28 is mounted within a socket 29 in the extension 8 and bears against the end of the drive shaft 4 so as to yieldably urge the low speed pinion member 9 away from the drive shaft 4 and thereby move the clutch control plate 26 in a direction to release the clutch.

Manually operable means for closing the clutch is provided in the form of a thrust bearing illustrated as a hardened steel ball 31 bearing in a shallow socket in the end of the stub shaft 11 of the low speed drive pinion and engaged by a hardened plug 32 slidably mounted in the end of the bearing 12 and operated by a lever 33 through an adjustable connection 34. Lever 33 is fulcrumed at one end as indicated at 35 to the casing 1 and is connected by a link 36 to an operating element 37. The operating element 37 may be manually actuated or it may be actuated electromagnetically, in which case it may be formed as the sliding core of a solenoid. In this case, it is preferable that the link 36 be extensible as indicated at 38 in order to permit the core 37 to complete its stroke, while maintaining a substantially uniform pressure on the clutch operating mechanism.

A driven shaft 39 is journalled as indicated at 41 in the wall 2 of casing 1 and at 42 in the wall 13 of the casing. A high speed driven gear 43 is suitably fixed on the driven shaft as indicated at 44, in meshing relation with the high speed drive gear 14. A low speed driven gear 45 is journalled on the driven shaft 39 and arranged to mesh with the low speed drive gear member 9.

An overrunning clutch connection is provided for rotating the driven shaft 39 from the low speed driven gear 45, here illustrated in the form of a hollow screw shaft 46 non-rotatably mounted on the driven shaft 39 as indicated at 47 in abutting relation with the low speed driven gear 45 and locked in such position by suitable means such as a thrust ring 48. A clutch plate 49 is threaded on the screw shaft 46 in position to be moved by such threaded engagement into or out of contact with the driven gear 45. The contacting surfaces 51 and 52 (Fig. 5) of the clutch plate 49 and driven gear 45 are preferably provided with interengaging lugs 53 and 54 respectively in order to positively transmit rotation from the gear to the clutch plate. Means for causing initial engagement of the clutch plate with the gear when the gear rotates faster than the clutch plate is provided in the form of a spring friction ring 55 slidably mounted in a groove 56 in the periphery of the clutch plate 49 and having an eye 57 adapted to engage a pin 58 mounted on the driven gear 45.

The longitudinal position of the low speed driven gear 45 on the driven shaft 39 is preferably defined by suitable thrust means such as a thrust ring 59, and the high speed gear is similarly retained against longitudinal movement on the driven shaft 39 as by means of locating wire 60 and thrust ring 61. A thrust bearing 62 is preferably provided for spacing the high speed driving gear 14 from the wall 2 of the casing 1 and thereby taking the reaction of the clutch applying pressure exerted through the thrust bearing 31, etc.

In the operation of the device, and starting with the high speed clutch 24, 25, etc., in relaxed position, actuation of the driving shaft 4 causes rotation of the low speed drive pinion 9 through the clutch sleeve 6, which rotation is transmitted to the low speed drive gear 45. Rotation of the friction ring 55 by the pin 58 causes the clutch plate 49 to be threaded over into engagement with the low speed drive gear 45, thus clutching said gear to the driven shaft 39 and causing rotation of the driven shaft at low speed.

When it is desired to operate the driven shaft at high speed, it is merely necessary to apply tension to the link 36 either manually or by means of a suitable electromagnetic actuating device, whereupon pressure is applied to the thrust bearing 31, causing the high speed clutch control plate 26 to be moved by the longitudinal movement of the low speed drive pinion 9 so as to frictionally engage the high speed clutch plates 24, 25 and thereby cause rotation to be transmitted from the clutch sleeve 6 to the high speed drive gear 14. Rotation is thereby imparted through the high speed driven gear 43 to the driven shaft 39 at the high gear ratio, whereupon the driven shaft overruns the low speed drive gear 45, and the low speed clutch plate 49 is caused to back away from the gear 45 and overrun the same.

When the tension on link 36 is relaxed, the clutch releasing spring 28 moves the low speed driving pinion 9 back to its original position, causing the control plate 26 to release the high speed clutch, whereupon the driven shaft 39 is once more rotated at low speed through the action of the overrunning clutch plate 49 as previously described.

The low speed drive pinion 9 and driven gear 45 are preferably formed as illustrated with inclined or helical teeth, and the end thrust caused by the inclination of such teeth is utilized to ensure the releasing action of the high speed clutch. In other words, the inclination of the teeth is such that when the load is being transmitted therethrough, the drive pinion 9 is urged by the longitudinal component of the driving force against the thrust bearing 31.

In a similar manner, the high speed drive gears 14 and 43 are also preferably provided with helical teeth, the driving reaction of which is utilized to urge the driving gear 14 against its thrust bearing 62 when the load is being transmitted through the low speed gearing. This end thrust of the high speed gear 14 is, of course, very slight since it is at that time being driven idly by the gear 43 at low speed, but it serves to take up any endwise lost motion that might be present in the mounting of the gear 14 on the clutch sleeve 6 and thus prevents dragging of the high speed clutch discs 24, 25.

Figure 6:
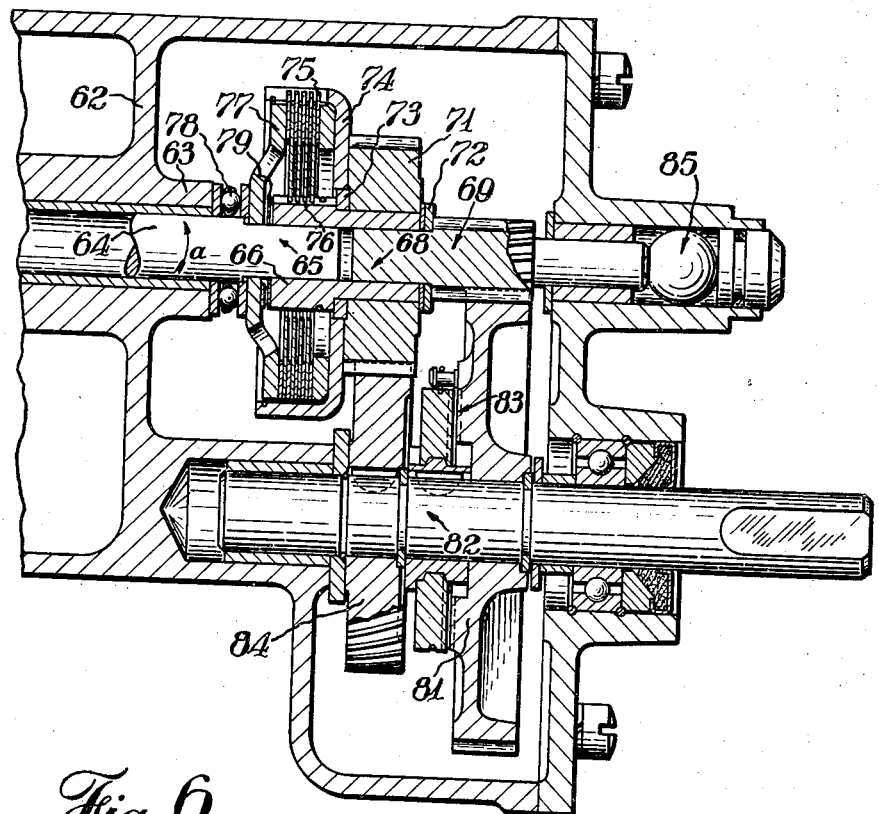
Fig. 6 is a view similar to Fig. 1 of a second embodiment of the invention.

In the embodiment of the invention illustrated in Fig. 6, the general arrangement of the gearing, and the mode of control of the high speed gear train is substantially similar to that previously described, but the high speed gear and clutch assembly has been faced about, and some changes made in the detailed arrangements of the cooperating parts. As there illustrated, a drive shaft 64 having a "double-D" section 65 is connected by a coupling sleeve 66 to a low speed pinion member 69 having a "double-D" section 68 slidably mounted in the coupling sleeve 66. A high speed driving gear 71 is journalled on the coupling sleeve 66, being confined thereon by thrust washers 72 and 73. A barrel clutch member 74 is fixed to the high speed drive gear 71 in any suitable manner, and clutch discs 75 and 76 within the barrel are alternately splined to the barrel and the coupling sleeve 66. A pressure disc 77 is non-rotatably mounted on the "double-D" section 65 of the drive shaft 64 and bears against a thrust bearing 78 which is positioned by the boss of the bearing 63 in casing 62 for the drive shaft 64. A suitable spring 79 is interposed between the pressure disc 77 and the end of the coupling sleeve 66 in order to normally maintain the clutch discs 75 and 76 out of engagement with each other.

Drive pinion 69 meshes with low speed driven gear 81 connected to the driven shaft 82 by an overrunning clutch mechanism indicated generally by numeral 83, and high speed drive gear 71 meshes with high speed driven gear 84 fixed on the driven shaft. Manually operated mechanism indicated generally by numeral 85 is provided for sliding the drive pinion member 69 longitudinally to control the high speed clutch 75, 76. Since the manual controlling means 85 and the overrunning clutch mechanism 83 are similar to those illustrated and described in connection with the first embodiment of the invention, further description thereof is deemed unnecessary.

As in the embodiment previously described, the elements of the gearing are provided with helical teeth, and the longitudinal component of the driving forces due to the helical form of the teeth is utilized to assist in controlling the high speed clutch. Thus, if the drive shaft 64 rotates in the direction of the arrow a, the driving pinion member 69 will be formed with left hand spiral teeth, and the high speed drive gear 71 will be formed with right hand spiral teeth. The longitudinal component of the driving force transmitted through the drive pinion 69 when operating in low gear will then tend to draw the drive pinion to the right in Fig. 6 and maintain the high speed clutch open, while the longitudinal component of the driving force transmitted through the high speed drive gear 71 when the device is operating in high gear will tend to move the high speed gear and barrel 74 to the left in Fig. 6 and assist in maintaining the high speed clutch closed. It will be noted that this latter component presses the clutch discs against the pressure disc 77 independently of the pressure exerted by the manually operated means 85 and therefore constitutes an additional or supplementary closing means for the high speed clutch. This pressure component is, however, insufficient to prevent the clutch from slipping when the manually operated pressure means is released, so that release of the manual means permits the clutch to slip, whereupon the drive is assumed by the low speed gearing as described in connection with the previous embodiment of the invention. The spring 79 merely serves to prevent any possibility of the clutch discs 75, 76 dragging on each other when the manual pressure means is released.

Although but two embodiments of the invention have been shown and described in detail, it will be understood that other embodiments are possible. Various changes may be made in the proportions and arrangements of the parts, and the gearing may be adapted for use in devices of various characters other than those indicated, all without departing from the spirit of the invention as defined in the claims appended hereto.

What is claimed is:

1. In a variable-speed transmission, a power shaft, a pinion member mounted coaxially therewith, a sleeve mounted on and slidably but non-rotatably connected to said shaft and pinion member, a gear freely journalled on said sleeve, a friction clutch for connecting said sleeve and gear, means actuated by longitudinal movement of the pinion member for controlling said clutch, and means under the control of the operator for sliding said pinion member in the sleeve.

2. In a variable-speed transmission, a power shaft, a pinion member mounted coaxially therewith, a sleeve mounted on and slidably but non-rotatably connected to said shaft and pinion member, a gear freely journalled on said sleeve, a barrel member fixed to said gear, friction clutch discs splined alternately to the barrel and sleeve, a presser disc mounted on said pinion member adapted to compress the friction discs, and means for sliding the pinion member longitudinally to control the clutch.

3. In a variable-speed reduction gear, a casing, a driving shaft journalled in a wall of the casing and extending into the casing, a pinion member including a stub shaft slidably journalled in an opposite wall of the casing in alignment with the driving shaft, a sleeve slidably but non-rotatably connecting the driving shaft and pinion, a gear journalled on the sleeve, means including a friction clutch for driving the gear from said sleeve, and means operated by longitudinal movement of the pinion member for controlling said clutch.

4. In a variable-speed reduction gear, a casing, a driving shaft journalled in a wall of the casing and extending into the casing, a pinion member including a stub shaft slidably journalled in an opposite wall of the casing in alignment with the driving shaft, a sleeve slidably but non-rotatably connecting the driving shaft and pinion, a gear journalled on the sleeve, means including a friction clutch for driving the gear from said sleeve, a clutch controlling element mounted on the pinion member, and means engaging said stub shaft for moving the pinion member and control element to close the clutch.

5. In a variable-speed transmission, a power shaft, a pinion member mounted coaxially therewith, a sleeve mounted on and slidably but non-rotatably connected to said shaft and pinion member, a gear journalled on said sleeve, a barrel member fixed to said gear, friction clutch discs splined alternately to the barrel and sleeve, a pressure disc mounted on said drive shaft, and means for sliding the pinion member, gear and barrel member to compress the clutch discs against the pressure disc.

6. In a variable-speed transmission, a casing, a power shaft mounted therein, a pinion member mounted coaxially therewith, a coupling sleeve mounted on and slidably but non-rotatably connected to said shaft and pinion member, a gear journalled on said sleeve, a barrel member fixed to said gear, friction clutch discs splined alternately to the barrel and sleeve, a pressure disc non-rotatably mounted on said drive shaft and forming a stop for said clutch discs, a thrust bearing between said pressure disc and casing, and manually operable means for sliding the pinion member, gear and barrel toward the pressure disc to compress the clutch discs.

7. In a variable-speed transmission, a drive shaft, a pinion member, a hollow sleeve in abutting relation to the pinion member and slidably but non-rotatably coupling the pinion member to the shaft, a gear journalled on the sleeve, a clutch barrel fixed to the gear, clutch discs splined alternately to the barrel and sleeve, a pressure disc mounted on the shaft, and manually operable means for moving the pinion member, sleeve, gear and clutch assembly toward the pressure disc to close the clutch.

8. In a variable-speed transmission for washing machines or the like, a drive shaft, a stub shaft and low speed drive pinion member mounted in alignment and coupled for rotation with the drive shaft, with freedom for relative longitudinal movement, a high speed drive gear rotatably mounted with respect to the drive shaft, a barrel member fixed to the high speed drive gear, friction clutch members slidably but non-rotatably connected alternately to the barrel and drive shaft, a pressure disc for the friction clutch members, and means whereby longitudinal movement of the stub shaft causes the friction clutch members to be compressed by the pressure disc to transmit rotation from the drive shaft to the high speed drive gear.

9. In a variable-speed transmission for washing machines or the like, a drive shaft, a stub shaft and low speed drive pinion member mounted in alignment and coupled for rotation with the drive shaft, with freedom for relative longitudinal movement, a high speed drive gear rotatably mounted with respect to the drive shaft, a driven shaft, a low speed driven gear meshing with the low speed drive pinion, an overrunning clutch connection between the low speed gear and driven shaft, a high speed driven gear fixed on the driven shaft meshing with the high speed drive gear, a barrel member fixed to the high speed drive gear, friction clutch members slidably but non-rotatably connected alternately to the barrel and drive shaft, a pressure disc for the friction clutch members, and manually operable means including an anti-friction thrust bearing for moving the stub shaft longitudinally to compress the friction clutch members and thus connect the high speed drive gear for rotation with the drive shaft.

MAURICE P. WHITNEY.